US008352913B2

(12) United States Patent
Sakhare et al.

(10) Patent No.: US 8,352,913 B2
(45) Date of Patent: Jan. 8, 2013

(54) GENERATING AND RESOLVING COMPONENT NAMES IN AN INTEGRATED DEVELOPMENT ENVIRONMENT

(75) Inventors: Kiran Sakhare, Bangalore (IN); Bhakti Pingale, Karnataka (IN)

(73) Assignee: Adobe Systems Incorporated, San Jose, CA (US)

( * ) Notice: Subject to any disclaimer, the term of this patent is extended or adjusted under 35 U.S.C. 154(b) by 711 days.

(21) Appl. No.: 12/537,368

(22) Filed: Aug. 7, 2009

(65) Prior Publication Data
US 2011/0035729 A1 Feb. 10, 2011

(51) Int. Cl.
*G06F 9/44* (2006.01)

(52) U.S. Cl. ........ 717/120; 717/121; 717/122; 717/123; 717/124; 717/125; 717/126; 717/127; 717/128; 717/129; 717/130; 717/131; 717/132; 717/133; 717/134; 717/135

(58) Field of Classification Search .................. None
See application file for complete search history.

(56) References Cited

U.S. PATENT DOCUMENTS

| 6,052,526 | A * | 4/2000 | Chatt ............................. 717/136 |
| 6,067,577 | A * | 5/2000 | Beard ............................ 719/331 |
| 6,564,213 | B1 * | 5/2003 | Ortega et al. ......................... 1/1 |
| 6,665,734 | B1 * | 12/2003 | Akilov et al. ................. 719/318 |
| 6,865,573 | B1 * | 3/2005 | Hornick et al. ............... 707/748 |
| 6,879,953 | B1 * | 4/2005 | Oishi et al. .................... 704/231 |
| 6,912,714 | B1 * | 6/2005 | Cocks et al. ................... 719/310 |
| 6,968,215 | B2 * | 11/2005 | Muramatsu .................... 455/566 |
| 7,107,594 | B1 * | 9/2006 | Fischer et al. ................. 719/310 |
| 7,194,743 | B2 * | 3/2007 | Hayton et al. ................. 719/315 |
| 7,401,340 | B2 * | 7/2008 | Leigh ............................ 719/332 |
| 7,483,901 | B1 * | 1/2009 | Massoudi et al. ..................... 1/1 |
| 7,756,886 | B1 * | 7/2010 | Murugesan et al. .......... 707/767 |
| 7,840,967 | B1 * | 11/2010 | Czajkowski et al. .......... 719/312 |
| 2002/0143755 | A1 * | 10/2002 | Wynblatt et al. .................. 707/3 |
| 2004/0073539 | A1 * | 4/2004 | Dettinger et al. ................. 707/3 |
| 2004/0193575 | A1 * | 9/2004 | Chen et al. ......................... 707/3 |
| 2007/0101315 | A1 * | 5/2007 | Dahyabhai et al. ........... 717/120 |
| 2007/0256055 | A1 * | 11/2007 | Herscu ........................... 717/115 |
| 2007/0294451 | A1 * | 12/2007 | Dahyabhai et al. ........... 710/244 |
| 2008/0016146 | A1 * | 1/2008 | Gan et al. ....................... 709/203 |
| 2009/0089740 | A1 * | 4/2009 | Crisman ........................ 717/106 |
| 2010/0058288 | A1 * | 3/2010 | Zitzewitz et al. ............. 717/105 |
| 2010/0146483 | A1 * | 6/2010 | Komarov et al. ............. 717/120 |

* cited by examiner

*Primary Examiner* — Henry Tsai
*Assistant Examiner* — Jing-Yih Shyu
(74) *Attorney, Agent, or Firm* — Kilpatrick Townsend & Stockton LLP

(57) ABSTRACT

A component name manager operates within an integrated development environment to assist developers in creating dynamic websites and Internet applications. The component name manager identifies an input field displayed on a graphical user interface of an object-oriented software development environment. The input field uses a fully-qualified name of a software component for accessing to access instructions and data associated with the software component and located at an application server. In response to receiving an input associated with the input field, the component name manager displays a list of qualified names of software components available for use in the object-oriented software development environment. Each of the qualified names identifies a path for accessing a corresponding software component. The component name manager can resolve fully qualified names by accessing one or more of an application file, an administrator interface, project level mappings, and global level preference mappings.

21 Claims, 9 Drawing Sheets

Server Settings > Mappings

ColdFusion mappings let the cfinclude and cfmodule tags access pages that are outside the Web root. If you specify a path that starts with the mapping's logical path in these tags, ColdFusion looks for the page using the mapping's directory path.

ColdFusion also uses mappings to find ColdFusion components (CFCs). The cfinvoke and cfobject tags and CreateObject function look for CFCs in the mapped directories.

Note: These mappings are independent of web server virtual directories. If you would like to create a virtual directory to access a given directory through a URL, please consult your web server documentation.

Add / Edit ColdFusion Mappings

Logical Path

Directory Path                          [ Browse Server ]

[ Add Mapping ]

Active ColdFusion Mappings

| Actions | Logical Path | Directory Path |
|---|---|---|
|  | /CFIDE | C:\ColdFusion9\wwwroot\CFIDE ⎫ 705 |
| ◉ | /gateway | C:\ColdFusion9\gateway\cfc ⎭ |

FIG. 7

GENERATING AND RESOLVING COMPONENT NAMES IN AN INTEGRATED DEVELOPMENT ENVIRONMENT

BACKGROUND

The present disclosure relates to software development. More specifically, some aspects of the disclosure relate to software development environments. Software development environments enable accelerated creation and maintenance of software and source code. One type of software development environment is an integrated development environment (IDE). An IDE is a powerful tool used by software developers to create software applications. An IDE combines several features for automating steps of software development. For example, an IDE can include a source code editor, a compiler and/or interpreter, build automation tools, and a debugger. With these features, an IDE is powerful because it can increase productivity and efficiency in creating software applications.

Many integrated development environments include the ability to develop software using object-oriented programming. Object-oriented programming is a style of computer programming that uses (and reuses) objects to build a software application. The objects can be any compilation of data, instructions, logic, attributes, variables, behaviors, methods, etc. Typically, objects include both data and functions. Object-oriented programming can also organize objects into classes, and include the ability for objects to inherit or derive functionality from another object or class. One primary advantage of object-oriented programming is increasing efficiency by reusing existing code, which in turn generates compact, easily maintainable code for an application.

SUMMARY

An integrated development environment, using object-oriented programming, can be used for developing software applications using dynamic programming languages. Dynamic programming languages include high-level computer programming languages that execute many processes at runtime, such as adding new code and extending objects. Specific named examples of dynamic programming languages include Lisp, Perl, PHP, Ruby, Pyton, VBScript, Tcl, and ColdFusion. Dynamic programming languages that use an object-oriented approach in building applications can also label the objects as components.

As components are designed to support the object-oriented programming concept, certain components extend and implement other components. When a developer writing a given component wishes to extend or implement an existing component, it can be necessary that the developer identify or determine and then use (i.e., reference) a fully-qualified name of the component. Some dynamic programming languages operate in conjunction with an application server that contains mappings of components. Mappings are used to locate an extending component. Components that may be available for use by the software developer may not all be located in the same location, and thus during the development process of a software application, the software developer must include a fully qualified name of the component within the software code that allows the software to properly locate the component of interest to that developer. The process of determining the fully qualified name (and hence location of) a component is called "resolving" the fully-qualified name. Conventional techniques for resolving the fully-qualified name of components, however, requires a developer to look into server mappings, server document root directory, or a current directory each time the developer wants to reference a component to generate a valid path for a component, that is, a component that will be correctly accessed at runtime. Finding and resolving fully-qualified component names is tedious and time consuming for software developers. If a given application has many components scattered throughout different file folders with many mappings defined in a server (or possibly on many different servers), then resolving component names using conventional techniques becomes even more difficult for the developer to discover the fully-qualified name of each component. A further challenge is that a developer operating an IDE has limited access or no access to server properties. Thus, it is very difficult for the developer, using conventional techniques, to determine fully qualified names of each component on an application server when developing an application with an associated IDE, especially when a developer needs to reference many different components many times by their fully-qualified names.

Techniques discussed herein may significantly overcome the challenges of generating and resolving component names in an integrated development environment. For example, as will be discussed further, certain specific embodiments herein are directed to a component name manager that can operate within an integrated development environment to assist developers in the identification and resolution of fully qualified component names. The component name manager identifies an input field displayed on a graphical user interface of an object-oriented software development environment. For example, this input field can be an editor window used for coding using a given dynamic programming language, or the input field can be a place within source code for receiving a name of a component. This input field can be enabled to receive a name of a software component for use in the object-oriented software development environment. The object-oriented software development environment can require a given qualified name of a given software component for access to the given software component. For example, a specific code segment within source code of a dynamic programming language contains a command or instructions for accessing a component located at an application server. In another example, an editor of an integrated development environment displays a pop-up window or other dialog box for receiving a name and a component. It is at this point that a developer would conventionally be required to supply a fully qualified name of a software component within the source code.

To assist in this regard, in response to receiving an input associated with the input field, the component name manager identifies and displays a list of qualified names of software components available for use in the object-oriented software development environment. For example, such a list of available components can appear as a drop-down menu, or be displayed within a window adjacent to an editor window. Each of the qualified names identifies a path for accessing a corresponding software component. This path can, for example, identify a mapping to a component located at an application server. The component name manager receives a selection of at least one of the qualified names of software components displayed in the list of qualified names of software components. A software developer can use a graphical pointing device or other means to toggle through and/or select a qualified name. In response to receiving the selection, the component name manager populates the input field with a qualified name of a software component that corresponds to the selection. For example, the source code is modified so that a reference to a given component also includes a valid path to the mapping of that given component within the application server. In this manner, the system disclosed herein avoids the software developer from having to research or discover, and then correctly manually enter (e.g. type in), the fully-qualified name of the desired component.

Prior to the component name manager displaying a list of qualified names of software components available for use, the component name manager can execute one or more sub processes. The component name manager can access a series of mappings of qualified names of software components located in a hierarchy of locations. Component name manager can access this series of mappings sequentially, randomly, progressively, or otherwise.

For a first group of mappings, component name manager accesses a component application file. The component application file includes predefined mappings of software components. The predefined mappings comprise names of software components that point to file access paths for accessing contents. For example, a developer can create custom mapping names for various components. In a specific example, a given specific component includes a long path to validly access this component on the application server, and/or the component happens to be a rarely use component such that the fully qualified name is not memorized due to low frequency of use. The component name manager can create a short name for the entire path, which the component name manager can access to resolve the fully qualified name.

In a second group of mappings, the component name manager accesses an administrator interface. This administrator interface includes mappings of software components. The administrator interface maintains settings and multiple projects for a given application server, such that the multiple projects share use of the software components. The administrator interface can maintain settings for all or multiple projects. Thus, the administrator interface can act as a shared folder. Component name manager can examine data files maintained by the administrator interface without launching the administrator interface to access the files.

For a third group of mappings, the component name manager accesses the mappings defined at a project level, and identifies software components currently accessible within a given project. In some embodiments, the dynamic programming language can operate without an application server. In such an embodiment, the component name manager enables a developer to define mappings on folders which are inside a given project, and identify that these mapping names should be used to resolve components residing inside these folders.

In a fourth group of mappings, component name manager accesses mappings defined at a global level by accessing pre-defined mappings within a shared folder accessible by multiple projects. The component name manager can place components in a shared folder for use by all projects. In this example embodiment, the component name manager can use a single mapping to refer to components inside the shared folder.

In another embodiment, the component name manager can recognize a hierarchy of components, and recognize where a developer is operating within the hierarchy of components in order to provide a qualified name or to create a fully qualified name at that given level within the project hierarchy.

An example advantage of techniques disclosed herein is to build applications more quickly and accurately, and to develop code to port to the application server. Regarding faster development, instead of having to search for and find components to resolve a qualified name, the component name manager can use code hinting to display a list of qualified names. Regarding improved efficiency, the component name manager addresses the porting issue to the server. As a developer creates an application in an IDE using the server settings, there are minimal or no porting issues in terms of the component's name resolution. The component name manager can enable an integrated development environment to effectively generate fully qualified names of components, with minimal effort from a developer or operator.

In addition to the example method, product, system, etc., embodiments as discussed above, and other embodiments herein, can include a configuration of one or more computerized devices, websites, servers, hosted services, workstations, handheld or laptop computers, or the like to carry out and/or support any or all of the method operations disclosed herein. In other words, one or more computerized devices or processors can be programmed and/or configured to include a component name manager and/or related functions as explained herein to carry out different embodiments as described herein.

Yet other embodiments herein include software programs to perform the steps and operations summarized above and disclosed in detail below. One such embodiment comprises a computer program product that has a computer-storage medium (e.g., a tangible computer readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting operations such as: identifying an input field displayed on a graphical user interface of an object-oriented software development environment. The input field enabled to receive a name of a software component for use in the object-oriented software development environment, the object-oriented software development environment requiring a given qualified name of a given software component for access to the given software component. In response to receiving an input associated with the input field, displaying a list of qualified names of software components available for use in the object-oriented software development environment, each of the qualified names identifying a path for accessing a corresponding software component. Receiving a selection of at least one of the qualified names of software components displayed in the list of qualified names of software components. And, in response to receiving the selection, populating the input field with a qualified name of a software component that corresponds to the selection. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, and apparatuses herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Adobe Systems Incorporated of San Jose, Calif., USA.

As discussed above, techniques herein are well suited for use in software applications supporting component name manager applications such as integrated development environments and dynamic programming languages. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 7 is a screen shot of a component name manager showing administrator level mappings according to embodiments herein.

DETAILED DESCRIPTION

Figure 1:
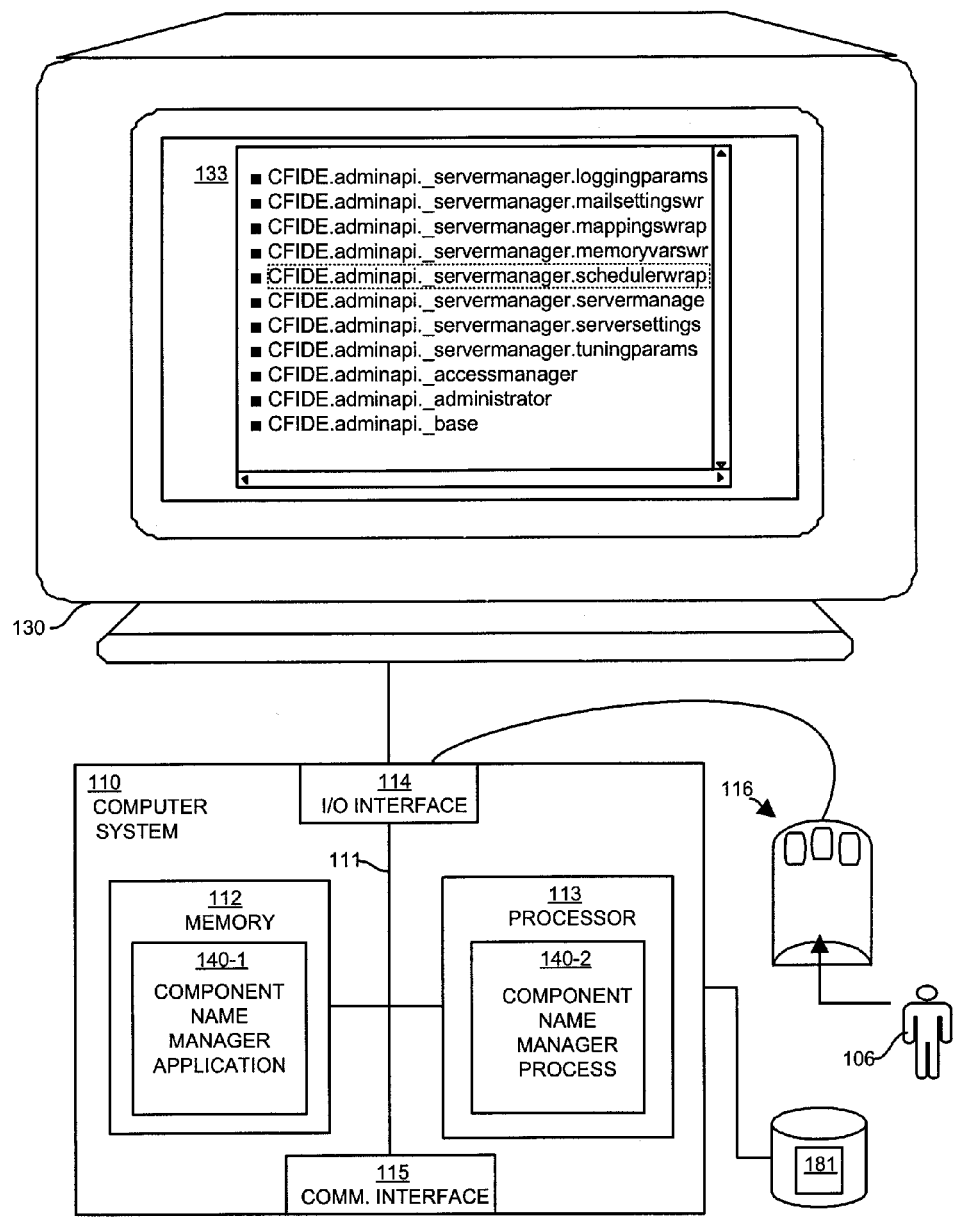
FIG. 1 is an example diagram of a component name manager for processing of content in a computer/network environment according to embodiments herein.

According to one example embodiment, a component name manager can operate within an integrated development environment to assist developers in creating dynamic websites and Internet applications. The component name manager identifies an input field displayed on a graphical user interface of an object-oriented software development environment. This input field can be enabled to receive a name of a software component for use in the object-oriented software development environment. As an example, when the software developer is developing some code in an editor of the IDE, the specific location within the code at which point a component name is to be included (i.e. is to be input via typing) can be automatically recognized by the component name manager (e.g. via string matching) and thus the component name manager can identify when and where (i.e. what specific location within the text of the source code) a requirement exists (during coding of an application) to provide a component name. In one specific example, the component name is to be supplied at an input field that the system disclosed herein can automatically recognize. In this manner, the object-oriented software development environment can require a given qualified name of a given software component within an input field for access to the corresponding software component. In response to receiving an input associated with the input field, the component name manager displays a list of qualified names of software components available for use in the object-oriented software development environment. As an example, if the input field for a component name is within quotation marks (e.g. " "), the system disclosed herein can automatically recognize this as an input field that is to be populated with a component name. As the software developer moves the cursor, graphical pointer or other input mechanism to this location, the system disclosed herein can identify this situation and in response can display a list of available component names that are usable at this location. This component name manager automatically (via processing explained herein) generates and displays this list in a pull down menu, for example. Each of the qualified names (i.e. in the list) identifies a path for accessing a corresponding software component. In one configuration, the list of component names is based on the current component under development and is contingent upon, for example, the current component name and any available inheritances of other classes of components that are available for use by the software under development. In this manner, the system avoids the developer from having to pause the software development process for long periods in order to research, discover, and then properly input (e.g. correct spelling, etc.) the fully-qualified name of a desired software component.

The component name manager then receives a selection of at least one of the qualified names of software components displayed in the list of qualified names of software components. In response to receiving the selection, the component name manager populates the input field with a qualified name of a software component that corresponds to the selection.

To automatically obtain the list of available names, the component name manager can access a series of mappings of qualified names of software components located in a hierarchy of locations to display the list of qualified names of software components available for use. For a first group of mappings, component name manager accesses a component application file. The component application file includes pre-defined mappings of software components. The predefined mappings comprise names of software components that point to file access paths for accessing contents. In a second group of mappings, component name manager accesses an administrator interface. This administrator interface includes mappings of software components. The administrator interface maintains settings, and multiple projects for a given application server, such that the multiple projects share use of the software components. For a third group of mappings the component name manager accesses the mappings defined at a project level to identify software components currently accessible within a given project. In a fourth group of mappings, the component name manager accesses mappings defined at a global level by accessing pre-defined mappings within a shared folder accessible by multiple projects.

While the techniques disclosed herein can apply to any dynamic programming language and/or object-oriented development environment, for convenience and for context in describing embodiments of the invention, the examples discussed below will make reference to a specific dynamic programming language, namely, the ColdFusion Markup Language (CFML).

CFML is a scripting language used by several conventionally available development environments for Internet application development. ColdFusion Markup Language is a tag-based scripting language that a developer uses to build ColdFusion applications. CFML uses a syntax that closely resembles HTML and XML, so it is ideally suited to programming applications that use these markup languages. Such a tag-based CFML syntax simplifies complex programming. Advanced developers can easily extend and customize CFML through custom tags, reusable object-based components, and user-defined functions, as well as integrate with other web services. CFML can provide database-driven Internet application development for websites and Internet application to dynamically access any database. CFML provides functionality that includes database commands, conditional operators, high-level formatting functions, and other elements.

Applications developed using CFML typically operate with a ColdFusion application server. When a browser requests a page in a ColdFusion application, the request is processed by a particular ColdFusion Application Server. Tags and components within CFML code instruct the ColdFusion application server to process the tagged information. By operating in conjunction with an application server, a developer can build dynamic websites and Internet Applications.

Because CFML contains tags and components for processing by an application server, it is important that the names of components have a valid, qualified name to be properly resolved. The component name manager of the present disclosure assists with generating and resolving names of such components.

FIG. 1 shows a general overview of the component name manager and how it can be tied to an example physical apparatus. Subsequent to the description of FIG. 1 appears a more detailed description of processes and methods executed by the component name manager itself. This subsequent description will walk through the flow charts and reference screen shots in the figures.

In FIG. 1, computer system 110 is shown connected to display monitor 130 for displaying a graphical user interface 133 for a user 106 to use an editor of an integrated development environment for building an application, using input devices 116, and to code and view content including resolving names of software components. Repository 181 can optionally be used for storing software components and data both before and after processing. Input devices 116 can include one or more devices such as a keyboard, computer mouse, etc.

Note that the following discussion provides a basic embodiment indicating how to carry out functionality associated with the component name manager 140 as discussed above and below. It should be noted, however, that the actual configuration for carrying out the component name manager 140 can vary depending on a respective application. For example, as previously discussed, computer system 110 can include one or multiple computers that carry out the processing as described herein.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the component name manager 140 of computer system 110 to communicate over a network and, if necessary, retrieve any data required to create views, process content, communicate with a user, etc. according to embodiments herein.

As shown, memory system 112 is encoded with component name manager application 140-1 that supports functionality as discussed above and as discussed further below. Component name manager application 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the component name manager application 140-1. Execution of the component name manager application 140-1 produces processing functionality in component name manager process 140-2. In other words, the component name manager process 140-2 represents one or more portions of the component name manager 140 performing within or upon the processor 113 in the computer system 110.

It should be noted that, in addition to the component name manager process 140-2 that carries out method operations as discussed herein, other embodiments herein include the component name manager application 140-1 itself (i.e., the unexecuted or nonperforming logic instructions and/or data). The component name manager application 140-1 may be stored on a tangible computer readable storage medium or any other computer readable media such as floppy disk, hard disk, optical medium, etc. According to other embodiments, the component name manager application 140-1 can also be stored in a memory type system such as in firmware, read only memory (ROM), or, as in this example, as executable code within the memory system 112.

In addition to these embodiments, it should also be noted that other embodiments herein include the execution of the component name manager application 140-1 in processor 113 as the component name manager process 140-2. Thus, those skilled in the art will understand that the computer system 110 can include other processes and/or software and hardware components, such as an operating system that controls allocation and use of hardware resources, or multiple processors.

Functionality supported by computer system 110 and, more particularly, functionality associated with component name manager 140 will now be discussed via flowcharts in FIG. 2 through FIG. 4. For purposes of the following discussion, the component name manager 140 or other appropriate entity performs steps in the flowcharts.

Figure 2:
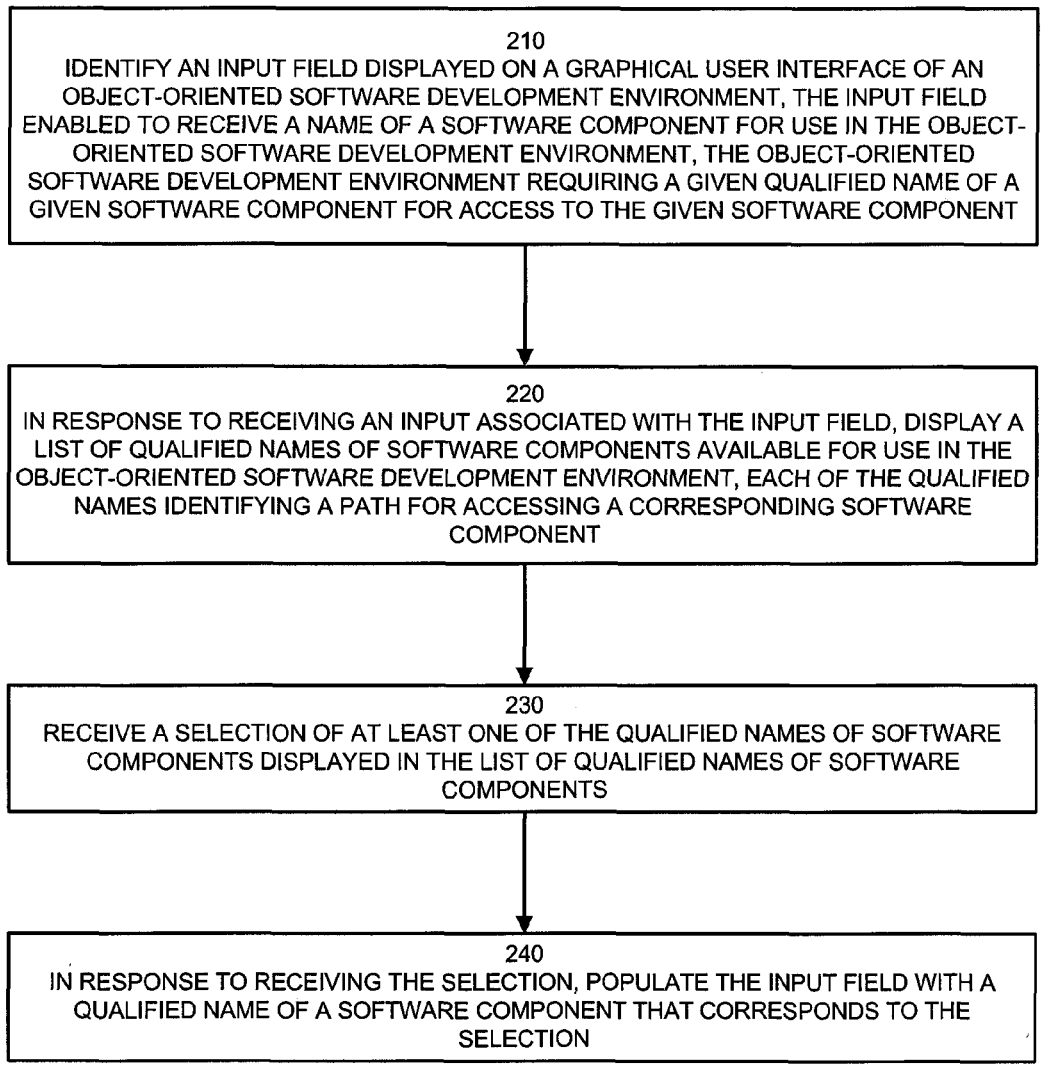
FIG. 2 is a flowchart illustrating an example of a process supporting generating and resolving software component names according to embodiments herein.

Now describing embodiments more specifically, FIG. 2 includes a flow chart for illustrating the process of an example embodiment for generating and resolving component names in an integrated development environment. By way of a non-limiting example, component name manager 140 can be embodied in a ColdFusion integration development environment. The ColdFusion IDE operates using "components" or "software components," which are similar to "classes" and/or "objects" in other object-oriented development environments. Using CFML, a developer can reuse parts of code and components in a given ColdFusion application. In this specific example embodiment, a ColdFusion component (CFC) contains a set of instructions and a set of interfaces. Developers can create functions embodied within a CFC file. After creating a CFC file, a developer can reuse this component across many projects, websites, and Internet applications.

Component name manager 140 assists developers to find certain files, meaning, finding a component with a qualified name. In a typical situation, there are various pre-existing components stored in various areas, and a developer desires to use one or more of these pre-existing components in a current project. When coding a given application using the example ColdFusion markup language, it is necessary to find a fully qualified name of a ColdFusion component. This means it can be necessary to find a correct path to a CFC file. In order to identify the correct path, a developer needs to input the correct name of the CFC. For example, a developer creates a component called "Projectcomponent.cfc" for use in one or more projects. The act of entering projectcomponent.cfc within a CFML editor is not sufficient to use the functions of that CFC. As a further challenge, such an editor can have limited access to mappings located at the server. It is important to point to the correct file to thereby provide a fully qualified name.

Figure 5:
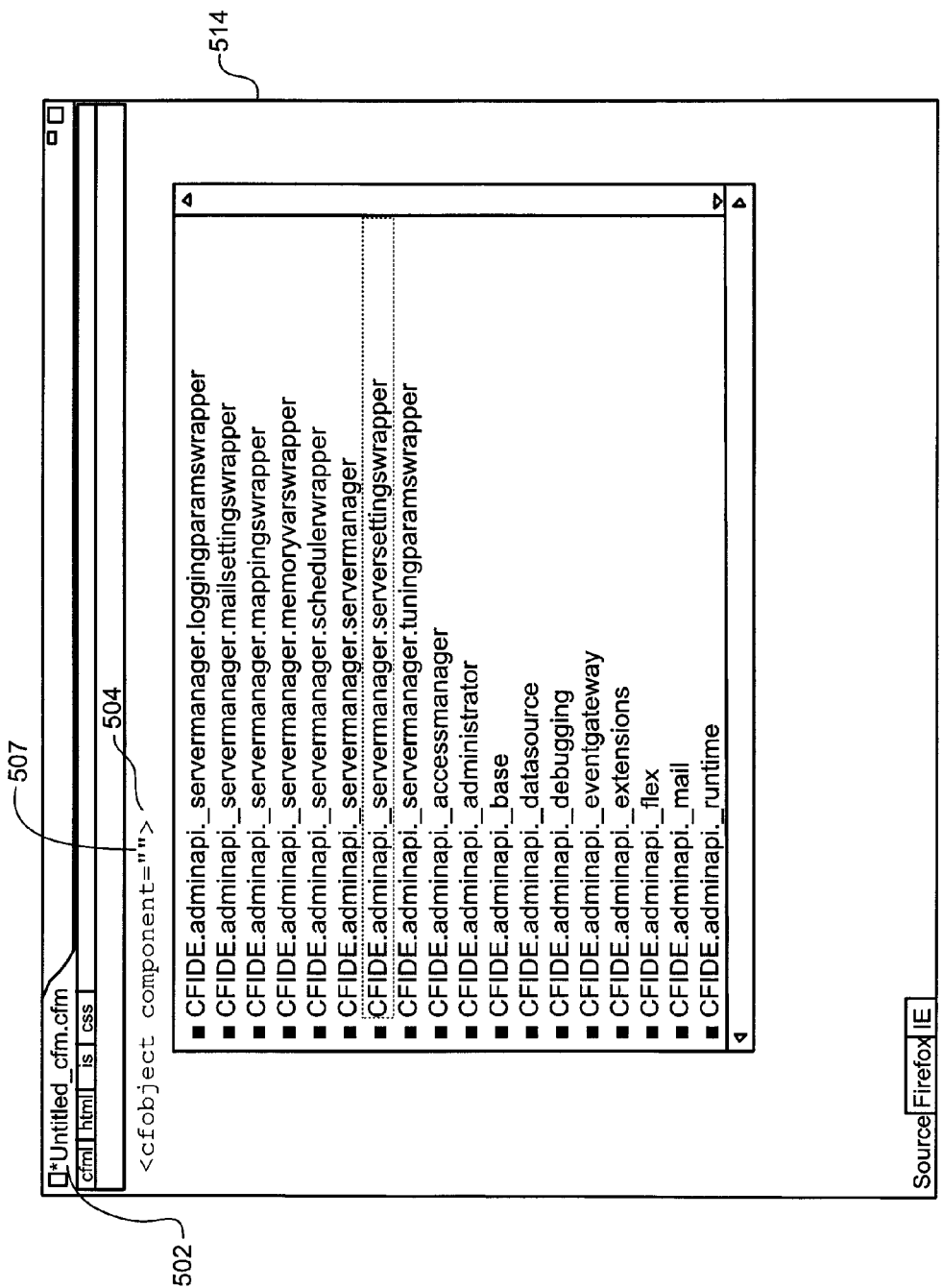
FIG. 5 is a screen shot of a component name manager displaying a list of fully qualified names of software components according to embodiments herein.

Accordingly, in step 210, of FIG. 2, component name manager 140 identifies an input field displayed on a graphical user interface of an object-oriented software development environment. For example, FIG. 5 show a screenshot of an example software development environment. This screenshot illustrates an IDE for entering code according to the ColdFusion markup language. Editor window 502 can be used for entering CFML code. Example code on line 504 reads: <cfcobject component=" ">.

This example code, according to the specifications of the ColdFusion markup language, invokes or references a ColdFusion component. Specifically, the "cfcobject component" language instructs a ColdFusion application server to invoke, process, or otherwise extend a named ColdFusion component that appears between the displayed quotes 507.

In this example, component name manager 140 identifies the syntax on line 504 as an input field displayed within editor 502. This input field is enabled to receive a name of a software component for use in the object-oriented software development environment. In this example, editor window 502 can receive additional character entry inputted either by a developer, component name manager 140, or other object handler. This object-oriented software development environment requires a given qualified name of a given software component for access to the given software component. In the CFML example, the ColdFusion application server executes a scripting language that references objects or components included in CFML of a given script. These objects or components can be stored at the ColdFusion application server. To be invoked properly, each ColdFusion component must be referenced with a fully qualified name that identifies a full path for accessing the ColdFusion component. As mentioned above, a given application server can store many different components in many different locations within the application server. In some scenarios, multiple components can have similar or identical names yet stored in different folders or subfolders, with each similarly-named component having different associated functionality. For example, two or more components could include a short name "mail.cfc," while one of the "mail.cfc" components is stored in an administrator folder while another "mail.cfc" component is stored within a specific project directory. Each CFC might include different instructions and dataset. Selecting the incorrect "mail.cfc" could prevent a website from functioning properly.

In step 220, in response to receiving an input associated with the input field, component name manager 140 displays a list of qualified names of software components available for use in the object-oriented software development environment. Each of the displayed qualified names identifies or includes a path for accessing the corresponding software component. In one embodiment, the input received by component manager 140 can be any trigger associated with line 504. For example, component name manager 140 can recognize that the language used in line 504 requires a dynamic programming language to reference a specific software component.

In another example, component name manager 140 can recognize the associated input is a cursor placed between displayed quotes 507 or after a first-appearing quote during coding in real time. In another example, while a user is entering text within editor window 502, component name manager 140 recognizes that the user is beginning to enter a command to reference an object or component, and then automatically displays an adjacent list of fully qualified names of components. Alternatively, component name manager 140 displays a pulldown menu or a drop-down menu from which a developer can select the fully qualified name. The list of fully qualified names of components can be dynamically updated. For example, component name manager identifies that a developer is typing a few characters. Upon identifying these few characters, the component name manager 140 uses this character input to limit search results for fully qualified names of components to names that begin with the one or more of the identified characters. Component name manager 140 can alternatively be configured to receive any part of a component name and display all possible related components.

In the ColdFusion example, component name manager 140 can identify one or more tags in the ColdFusion markup language that use components. Some of these tags can include "<cfObject>," "<cfInvoke>," or "<cfComponent>." An example tag that includes a fully qualified name is: <cfcomponent extends="CFIDE.administrator.extendCFC" implements="cfdocs.impinter">

Display window 514 illustrates an example of component name manager 140 displaying a list of qualified names of software components available for use. Within display window 514 appears a vertical list of names of software components. In the illustrated example the displayed software component names are CFCs from a mapping defined in a server administrator. In this specific example, the mapping "CFIDE" points to "C\ColdFusion9\wwwroot\CFIDE" on a server machine. The CFCs under the CFIDE directory are resolved with prefix CFIDE, which is a mapping name. For example, "CFIDE.adminapi.administrator," displayed in the list, is resolved for a CFC pointing under location "C:\ColdFusion9\wwwroot\CFIDE\adminapi\administrator.cfc." Thus, each of the displayed names includes or references a full path of each component.

In step 230, component name manager 140 receives a selection of at least one of the qualified names of software components displayed in the list of qualified names of software components in display window 514. Component name manager 140 can receive such a selection in various ways. For example, a developer interacting with the graphical user interface can use a graphical pointing device to select one of the displayed software components. Alternatively, a developer can scroll through the displayed software component names, or toggle through the names, and highlight a specific software component name as a selection.

In step 240, in response to receiving the selection, component name manager 140 populates the input field with a qualified name of a software component that corresponds to the selection. In one example, component name manager 140 inserts the name of a selected component in line 504. After populating this input field, component name manager 140 updates line 504 to read, for example: <cfcobject component="CFIDE.adminapi.administrator">.
This updated language indicates a fully qualified name that a ColdFusion server will be able to resolve to locate the correct ColdFusion component.

Figure 3:
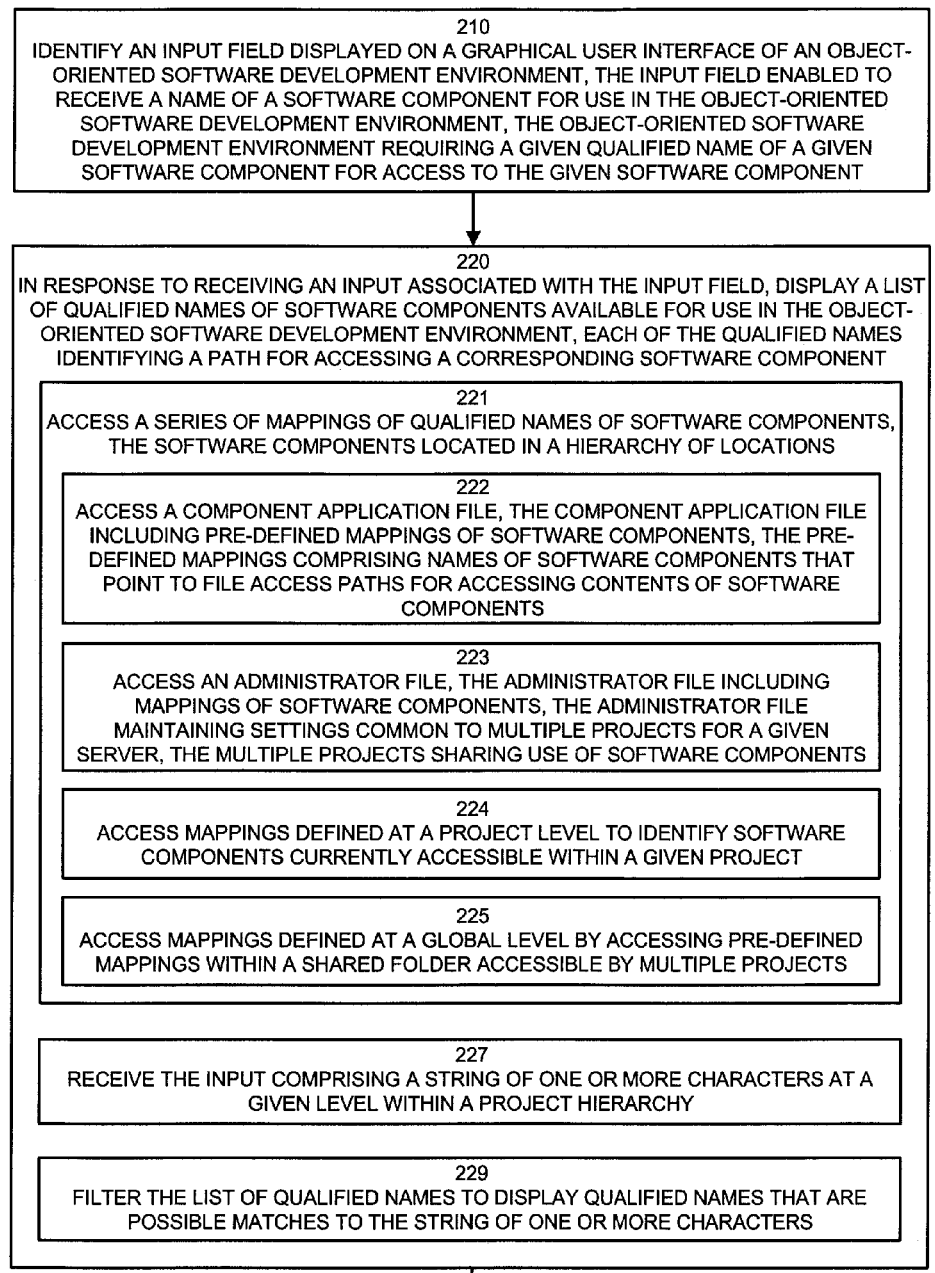
FIGS. 3-4 show a flowchart illustrating an example of a process supporting generating and resolving software component names according to embodiments herein.
Figure 4:
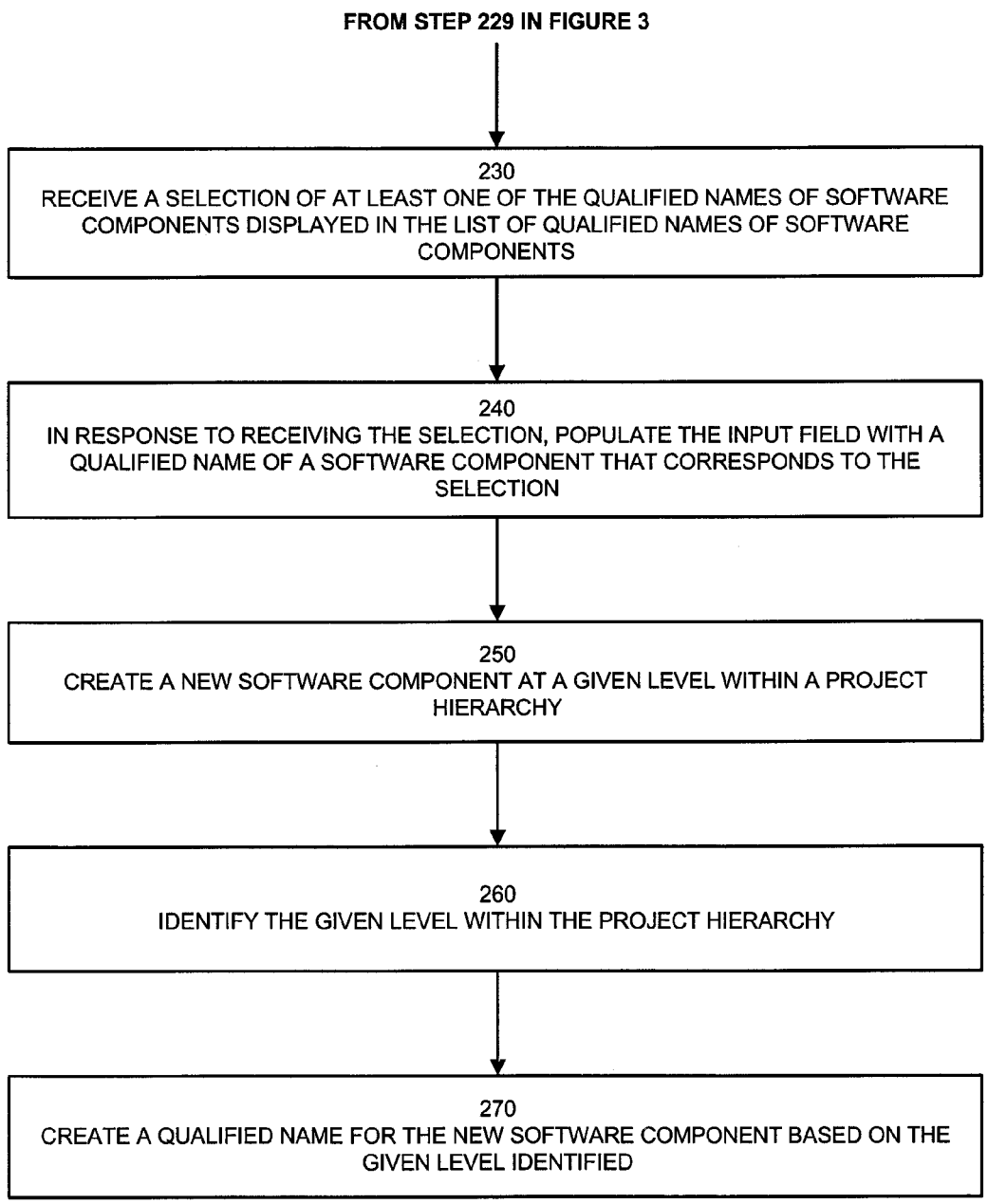

FIGS. 3 and 4 include a flowchart illustrating another embodiment of the techniques disclosed herein.

In step 210, of FIG. 3, component name manager 140 identifies an input field displayed on a graphical user interface of an object-oriented software development environment. This input field is enabled to receive a name of a software component for use in the object-oriented software development environment. This object-oriented software development environment requires a given qualified name of a given software component for access to the given software component.

In step 220, in response to receiving an input associated with the input field, component name manager 140 displays a list of qualified names of software components available for use in the object-oriented software development environment. Each of the displayed qualified names identifies or includes a path for accessing the corresponding software component.

In step 221, component name manager 140 accesses a series of mappings of qualified names of software components, the software components being located in a hierarchy of locations. As mentioned, components can be created and distributed across a project, and can number hundreds or thousands or more of different names of components. It thus becomes difficult for a developer to arrive at those qualified names. The component name manager 140 can assist the developer in automatically looking up fully qualified names.

There are several methods for component name manager 140 to find qualified names. The component name manager 140 can access various mappings in a predetermined order, simultaneously, or randomly. There are at least four ways that component name manager 140 can call a software component. These ways include: (1) accessing mappings defined in the application file, (2) accessing mappings defined in an administrator feature of an IDE, (3) accessing mappings defined in a project level, and (4) accessing mappings defined within a global level (preferences). Using a predetermined order, component name manager 140 first checks the application file. If no possible mapping exists in the application file, then component name manager accesses administrator mappings, and can continue to other ways for resolving component names. Using simultaneous access, the component name manager 140 examines each location at the same time and returns all possible mappings.

As mentioned, the component name manager 140 can access mappings in a predetermined order, simultaneously or randomly. In some embodiments, component name manager 140 follows a specific order of generating a qualified name of a component. In such an embodiment, component name manager 140 generates names of components in the following order: (1) application, (2) server administrator mapping, (3) project level, (4) global level. Component name manager 140 follows such an order to avoid conflicts while generating qualified names. By way of a non-limiting example, a first mapping is defined in a server administrator as: components=C:\webroot\components
A second mapping in a project level also includes components in the location: C:\webroot\components.
In this example situation, component name manager 140 then generates a qualified name for a component by using server administrator mapping information because component name manager 140 follows a specific order to generate names of components. In other words, in some embodiments there are two possible ways of resolving qualified name information. In the above example, a same component can have two qualified names—one from server mappings and another from project level mappings. Thus, following a specific order of mappings to generate and resolve fully qualified names helps to avoid such conflicts.

In step 222, component name manager 140 accesses a component application file. The component application file includes pre-defined mappings of software components. The pre-defined mappings comprise names of software components that point to file access paths for accessing contents of software components. In the example context of the ColdFusion IDE, such mappings can be located in an application. CFC file. The application.CFC file contains settings for an application, including mappings settings, as the name of a mapping can be equal to the location of the mapping. A developer can manually create this file in a folder. Such mappings can be defined in the application.CFC file using the following code snippet: <cfset THIS.mappingsr["MyStuff"]="c:\inetpub\MyStuff">
In this code snippet example, the CFCs under the application. CFC file will be resolved to the map name "MyStuff." More particularly, Application.cfc can be located in "C:\inetpub\wwwroot\site\components\Application.cfc," to resolve the fully qualifed name of the CFC, "C:\inetpub\wwwroot\site\components\dbAccess\sample\test.cfc" is "MyStuff.dbAccess.sample.test."

Figure 6:
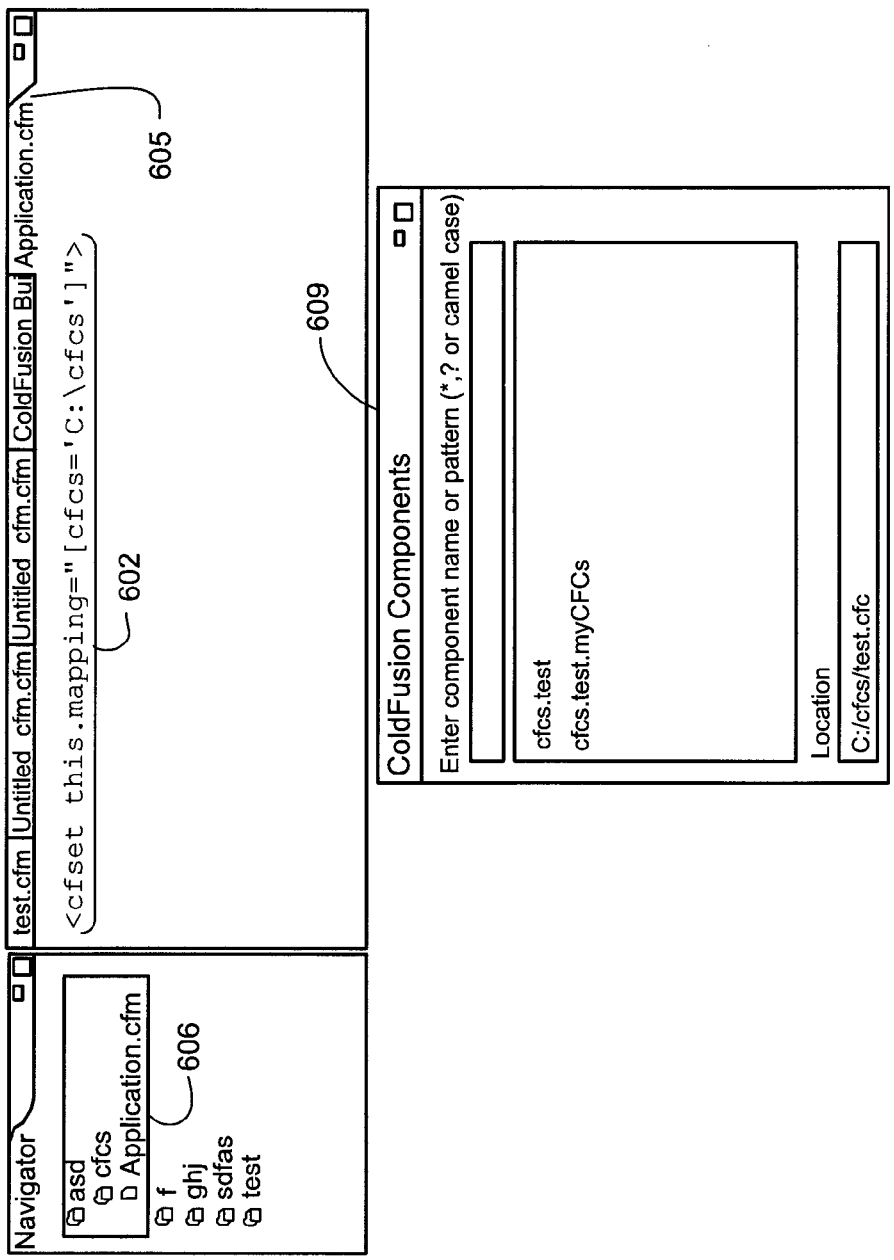
FIG. 6 is a screen shot of a component name manager showing application level mappings according to embodiments herein.

FIG. 6 shows a screenshot of an IDE that illustrates such Application level mappings. Line 602 demonstrates mapping within an application folder 605. Component name manager 140 uses line 602 to define a mapping, where the mapping name is "cfcs" and the mapping location is "C:\cfcs." Box 606 shows that "application.CFM" is defined in project "asd." The cfcs which are under or on a same folder level are resolved with a mapping defined in application.CFM. Dialog box 609 illustrates how a ColdFusion component, under the application.CFM folder, is resolved with mapping defined in application.CFM Thus, a user/developer can define a mapping instead of entering an entire path in CFML code. As mentioned, software components can be located across many folders and subfolders. Referencing components during coding within a given dynamic language can therefore become tedious to reference an entire path each time a component is referenced—especially with long or rarely used paths. The component name manager 140 enables a developer to create a short name for the entire path. The short name can point to a uniform resource locator or other identifier. Without component name manager 140, a developer must enter an entire path name from memory, or tediously browse through folders and subfolders to locate a path name to import or paste into an editor of the IDE.

If after accessing the software component application file, component name manager 140 fails to identify and resolve a mapping, component name manager 140 can progress to a next level or process of accessing mappings, such as an administrator process.

In step 223, component name manager 140 accesses an administrator interface. The administrator interface includes mappings of software components. The administrator interface maintains settings, and mappings to multiple projects for a given server. The multiple projects share use of software components. In the ColdFusion example, one task executed by the IDE during startup is to collect server properties. During this process of collecting server properties, component name manager 140 collects mappings defined in a ColdFusion administrator. ColdFusion administrator mappings are primarily defined to resolve software components from fully qualified names. Hence, when generating the qualified name from the IDE, component name manager 140 evaluates mappings defined in a ColdFusion administrator. While generating the qualified name of the component, component name manager 140 checks if a given component falls under a map location. If this is true, then "mapName" is used to calculate the qualified name of the software component.

A given object-oriented software development environment can create a scripting language that operates with an application server. In this scenario, the application server comes with an administrator interface. To change settings or make adjustments to the application server, the IDE provides an administrator page to make any such changes or modification of settings. Any such change will become common to the entire application server. If a developer creates multiple projects on one application server, then any changes made to the server settings will be common to all projects and all files that are associated with that application server.

Each application server can have an independent administrator page associated with it. The administrator maintains settings, and to all projects. Component name manager 140 can examine data files maintained by the administrator without needing to launch the administrator to look into the files. Typically, a developer would put all shared components in one location. The administrator can then go and add a mapping for the shared folder.

If a user needs to define a mapping then the user can launch the administrator interface with the IDE. That is, a user can define a mapping of the component for use by any or all projects. Component name manager 140 can even look at files that the administrator previously created to find mappings that enable a name to be resolved into a fully qualified name. FIG. 7 is a screenshot of an administrator page within an example ColdFusion integrated development environment. In this administrator page a developer is enabled to add or edit mappings of software components. The administrator page shows both logical path and the directory path for software component mapping defined under a server administrator, as shown on lines 705.

In step 224, component name manager 140 accesses mappings defined at the project level to identify software components currently accessible within a given project. Such functionality enables a developer to define custom mappings on folders that are inside a given project. Component name manager 140 uses such mapping names to resolve components residing inside project level folders. For example, the folder "MyCFC" in a project is assigned with "MapName=mystuff." With a software component inside "MyCFC," component name manager 140 examines "MyCFC/components/example/test.cfc" and resolves this to "myStuff.camponents.example.test."

Defining mappings at the project level can also be useful in situations where a developer is not using a server. In this situation, component name manager 140 enables developers to resolve a mapping based on whatever components a developer currently has in a given project. In displaying such mappings on the project level, the component name manager 140 can restrict a list of available fully qualified names depending on where an editor or developer is operating within a given project.

Figure 8:
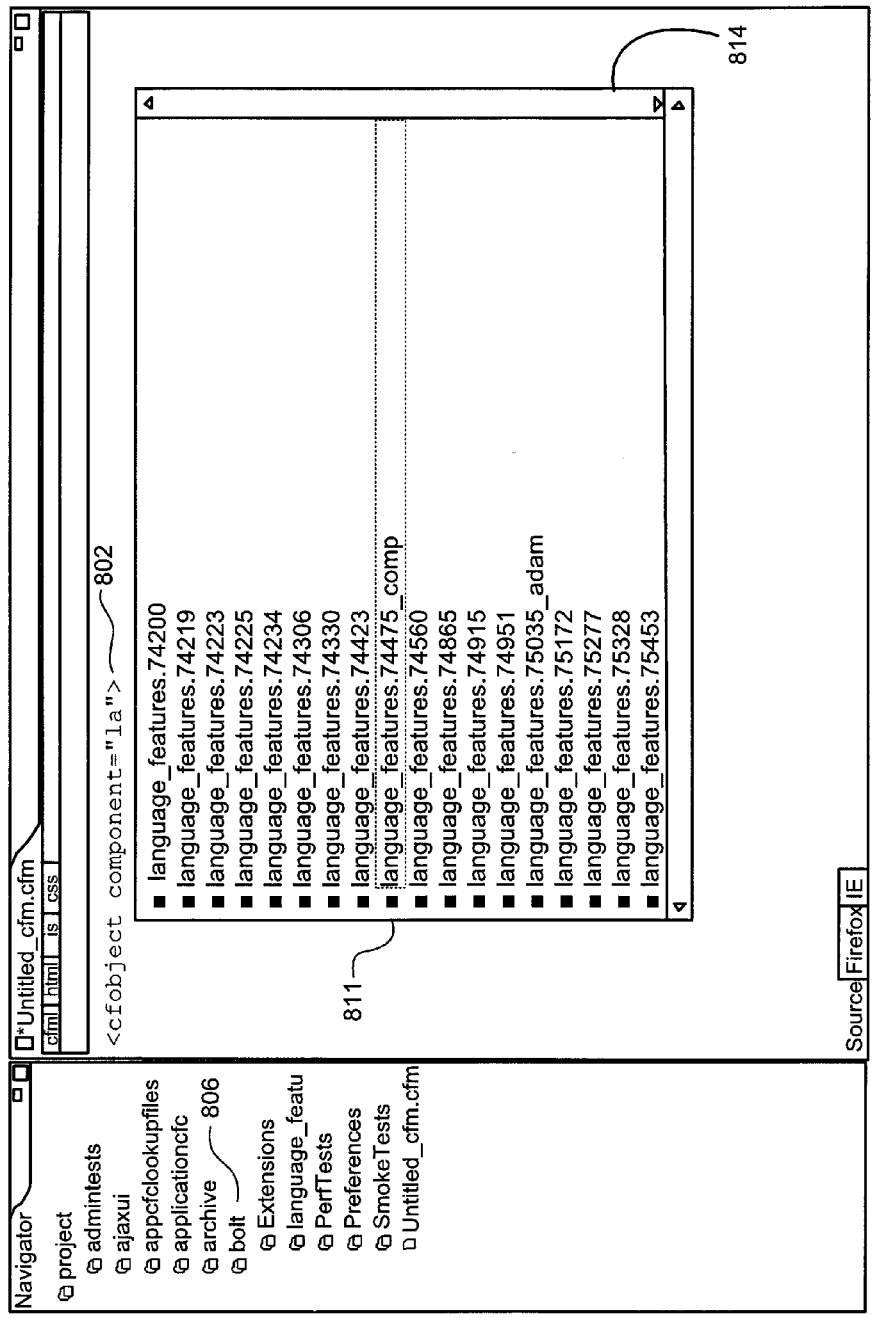
FIG. 8 is a screen shot of a component name manager displaying project level mapping according to embodiments herein.

FIG. 8 is a screenshot illustrating project level mapping in a given IDE as 10 explained. Line 802 shows currently entered text in the ColdFusion markup language within a ColdFusion editor (Untitled_cfm.cfm) for which a software component proposal is invoked. Folder 806 shows a current selection within the editor. Display window 814 displays a list of proposed software components from the editor, which is operating in "/project/bolt." The software components under "/project/bolt" can resolve from folder 15 "/project/bolt," while other software components are resolved from "/project/." Line 811 highlights a qualified name generated at runtime for a particular software component "74475_comp" under folder "language_features."

Figure 9:
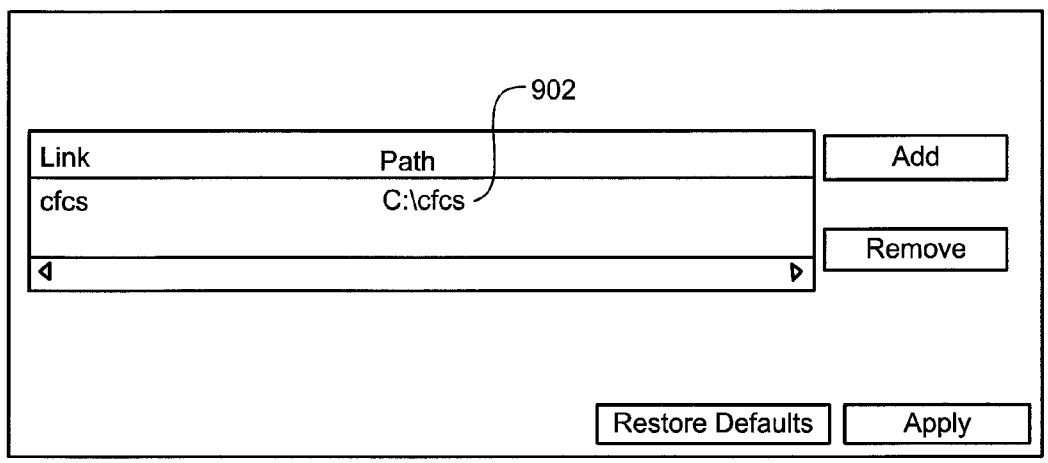
FIG. 9 is a screen shot of a component name manager displaying global level mapping according to embodiments herein.

In step 225, component name manager 140 accesses mappings defined at a global level by accessing pre-defined mappings within a shared folder accessible by multiple projects. Defining mappings at such a global level can be executed through preferences settings of a given IDE. In some scenarios, component name manager 140 places ColdFusion components in a shared folder for use by all or multiple projects. A given developer may wish to use a single mapping to refer to the software components inside the shared folder. Component name manager 140 enables the developer to define mappings and preferences of an IDE. Subsequently, any CFC referred to in the folder "Mapname" will be used to arrive on a qualified name of the software component. An application built using the above techniques needs only minimal efforts during deployment, such as creating a mapping defined on a project folder and preferences into an application server. FIG. 9 shows a screenshot 902 illustrating a dialog box for defining mappings at a global level. Such mappings can be used across any project. In this example, for any ColdFusion components referred to under "C:\cfcs," component name manager 140 will refer to such components with the mapping name "cfcs."

In step 227, component name manager 140 receives input comprising a string of one or more characters at a given level within a project hierarchy. Component name manager 140 can receive such input within an editor of an IDE, or within a dialog box specifically designed for creating software components. Component name manager 140 is sufficiently intelligent to identify at which level a software component is being created to be able to create a fully qualified name for a given software component.

In step 229, component name manager 140 filters the list of qualified names to display qualified names that are possible matches to the string of one or more characters. Component name manager 140 can use many different criteria or bases for identifying possible matches. For example possible matches can be based on an alphabetical filtering of qualified names, or based on a character string match of any part of the qualified name, or even a possible match to properties or folders associated with the string of one or more characters. In a specific example, component name manager 140 receives a string of two characters "la" after recognizing a command for invoking or referencing a software component, such as is shown in line 802 of FIG. 8. Display window 814 and then shows a filtered list of qualified names to display qualified names that are possible matches. Note that names of software components displayed in display window 814 all begin with the letters "la."

In step 230, component name manager 140 receives a selection of at least one of the qualified names of software components displayed in the list of qualified names of software components.

In step 240, in response to receiving the selection, component name manager 140 populates the input field with a qualified name of a software component that corresponds to the selection.

In step 250, component name manager 140 creates a new software component at a given level within a project hierarchy. As mentioned, projects can have many folders and subfolders containing software components. Component name manager 140 can identify at which level or folder software components are being created for creating a fully qualified name for the given software component. In response to changing a folder, the component name manager 140 can automatically change the list of possible fully qualified names based on a new folder selection or folder location. Thus, displaying the list of qualified names of software components can include restricting the list to display qualified names based on the given level within the project where component name manager 140 received the input.

In step 260, component name manager 140 identifies the given level within the project hierarchy. Thus, depending on the level at which a developer is operating within the editor of the IDE, the fully qualified name can change.

In step 270, component name manager 140 creates a qualified name for the new software component based on the given level identified. For example, such a process can be embodied as the tool or wizard for creating software components. Such a tool or wizard can operate in response to specific character input within the editor, or in response to invoking a component name creation tool. When operating within an editor of an IDE, component name manager 140 identifies when a cursor is in a specified location for entering a fully qualified component name, and then displays a list for selecting a fully qualified name, or displays a list of suggested names for creating a new software component. In an alternative embodiment, instead of automatically displaying a list of fully qualified names the component name manager 140 can provide a browse button to explore fully qualified names of pre-existing software components or to display fully qualified names for creating a new software component.

Such name generation is useful because properly coding in dynamic programming languages can be time-consuming for a developer to think of what would be a valid and fully qualified name, or how to resolve a name. If the component is not fully qualified, then it is just a filename, and might not be accessed during execution of a given website or Internet application. Thus the component name manager 140 enables faster and more efficient development.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method comprising:
identifying an input field displayed on a graphical interface of an object-oriented software development environment, the input field enabled to receive a name of a software component for use in the object-oriented software development environment, the object-oriented software development environment requiring a given qualified name of a given software component for access to the given software component;
in response to receiving an input associated with the input field, determining a plurality of software components corresponding to the input and available for use in the object-oriented software development environment, each of the plurality of software component comprising executable code for use in an application developed by the object-oriented software development environment;
displaying a list of qualified names of the plurality of software components, each of the qualified names identifying a path for accessing a corresponding software component, wherein displaying the list of qualified names of software components comprises at least one of:
accessing a component application file having pre-defined mappings of software components, the pre-defined mappings comprising names of software components that point to file access paths for accessing contents of the software components,
accessing an administrator interface including mappings of the software components, the administrator interface maintaining settings common to multiple projects for a given server, the multiple projects sharing use of the software components,
accessing mappings defined at a project level to identify software components currently accessible within a given project, and
accessing mappings defined at a global level by accessing pre-defined mappings within a shared folder accessible by the multiple projects;
receiving a selection of at least one of the qualified names of software components displayed in the list of qualified names of software components; and
in response to receiving the selection, populating the input field with a qualified name of a software component that corresponds to the selection.

2. The computer-implemented method of claim 1, wherein displaying the list of qualified names of software components further comprises:
accessing a series of mappings of qualified names of software components, the software components located in a hierarchy of locations.

3. The computer-implemented method of claim 2, wherein accessing a series of mappings comprises:
accessing the component application file.

4. The computer-implemented method of claim 3, wherein accessing a series of mappings further comprises:
accessing the administrator interface.

5. The computer-implemented method of claim 4, wherein accessing a series of mappings further comprises:
   accessing the mappings defined at the project level.

6. The computer-implemented method of claim 5, wherein accessing a series of mappings further comprises:
   accessing the mappings defined at the global level.

7. The computer-implemented method of claim 1, wherein displaying the list of qualified names of software components in response to receiving the input associated with the input field further comprises:
   receiving the input comprising a string of one or more characters; and
   filtering the list of qualified names to display qualified names that are possible matches to the string of one or more characters.

8. The computer-implemented method of claim 1, wherein receiving the input associated with the input field includes receiving the input at a given level within a project hierarchy; and
   wherein displaying the list of qualified names of software components further comprises restricting the list to display qualified names based on the given level within the project where the input was received.

9. The computer-implemented method of claim 1, further comprising:
   creating a new software component at a given level within a project hierarchy identifying the given level within the project hierarchy; and
   creating a qualified name for the new software component based on the given level identified.

10. The computer-implemented method of claim 1, wherein the input is received with an editor of the object-oriented software development environment, the editor receiving web development code executable by a server, wherein the software components are located at the server, wherein the editor has limited access to component mappings located at the server.

11. A computer program product including a computer-storage medium having instructions stored thereon for processing data information, such that the instructions, when carried out by a processing device, enable the processing device to perform the operations of:
   identifying an input field displayed on a graphical interface of an object-oriented software development environment, the input field enabled to receive a name of a software component for use in the object-oriented software development environment, the object-oriented software development environment requiring a given qualified name of a given software component for access to the given software component;
   in response to receiving an input associated with the input field, determining a plurality of software components corresponding to the input and available for use in the object-oriented software development environment, each of the plurality of software component comprising executable code for use in an application developed by the object-oriented software development environment;
   displaying a list of qualified names of the plurality of software components, each of the qualified names identifying a path for accessing a corresponding software component, wherein displaying the list of qualified names of software components comprises at least one of:
   accessing a component application file having pre-defined mappings of software components, the pre-defined mappings comprising names of software components that point to file access paths for accessing contents of the software components,
   accessing an administrator interface including mappings of the software components, the administrator interface maintaining settings common to multiple projects for a given server, the multiple projects sharing use of the software components,
   accessing mappings defined at a project level to identify software components currently accessible within a given project, and
   accessing mappings defined at a global level by accessing pre-defined mappings within a shared folder accessible by the multiple projects;
   receiving a selection of at least one of the qualified names of software components displayed in the list of qualified names of software components; and
   in response to receiving the selection, populating the input field with a qualified name of a software component that corresponds to the selection.

12. The computer program product of claim 11, wherein displaying the list of qualified names of software components further comprises:
   accessing a series of mappings of qualified names of software components, the software components located in a hierarchy of locations.

13. The computer program product of claim 12, wherein accessing a series of mappings comprises:
   accessing the component application file.

14. The computer program product of claim 13, wherein accessing a series of mappings further comprises:
   accessing the administrator interface, the administrator interface including mappings of software components.

15. The computer program product of claim 14, wherein accessing a series of mappings further comprises:
   accessing the mappings defined at the project level.

16. The computer program product of claim 15, wherein accessing a series of mappings further comprises:
   accessing the mappings defined at the global level.

17. The computer program product of claim 11, wherein displaying the list of qualified names of software components in response to receiving the input associated with the input field further comprises:
   receiving the input comprising a string of one or more characters; and
   filtering the list of qualified names to display qualified names that are possible matches to the string of one or more characters.

18. The computer program product of claim 11, wherein receiving the input associated with the input field includes receiving the input at a given level within a project hierarchy; and
   wherein displaying the list of qualified names of software components includes restricting the list to display qualified names based on the given level within the project where the input was received.

19. The computer program product of claim 11, further comprising:
   creating a new software component at a given level within a project hierarchy identifying the given level within the project hierarchy; and
   creating a qualified name for the new software component based on the given level identified.

20. The computer program product of claim 11, wherein the input is received with an editor of the object-oriented software development environment, the editor receiving web development code executable by a server, wherein the software components are located at the server, wherein the editor has limited access to component mappings located at the server.

21. A computer system comprising:
   a processor;
   a memory coupled to the processor, the memory storing instructions that when executed by the processor cause the system to perform the operations of:
   identifying an input field displayed on a graphical interface of an object-oriented software development environment, the input field enabled to receive a name of a software component for use in the object-oriented software development environment, the object-oriented software development environment requiring a given qualified name of a given software component for access to the given software component;
   in response to receiving an input associated with the input field, determining a plurality of software components corresponding to the input and available for use in the object-oriented software development environment, each of the plurality of software component comprising executable code for use in an application developed by the object-oriented software development environment;
   displaying a list of qualified names of the plurality of software components, each of the qualified names identifying a path for accessing a corresponding software component, wherein displaying the list of qualified names of software components comprises at least one of:
   accessing a component application file having pre-defined mappings of software components, the pre-defined mappings comprising names of software components that point to file access paths for accessing contents of the software components,
   accessing an administrator interface including mappings of the software components, the administrator interface maintaining settings common to multiple projects for a given server, the multiple projects sharing use of the software components,
   accessing mappings defined at a project level to identify software components currently accessible within a given project, and
   accessing mappings defined at a global level by accessing pre-defined mappings within a shared folder accessible by the multiple projects;
   receiving a selection of at least one of the qualified names of software components displayed in the list of qualified names of software components; and
   in response to receiving the selection, populating the input field with a qualified name of a software component that corresponds to the selection.

* * * * *